United States Patent
Wegenkittl et al.

(10) Patent No.: US 7,786,990 B2
(45) Date of Patent: Aug. 31, 2010

(54) CURSOR MODE DISPLAY SYSTEM AND METHOD

(75) Inventors: Rainer Wegenkittl, Sankt Poelten (AT); Donald K. Dennison, Waterloo (CA); John J. Potwarka, Waterloo (CA); Lukas Mroz, Vienna (AT); Armin Kanitsar, Vienna (AT); Gunter Zeilinger, Vienna (AT)

(73) Assignee: Agfa HealthCare Inc., Toronto (CA)

( * ) Notice: Subject to any disclaimer, the term of this patent is extended or adjusted under 35 U.S.C. 154(b) by 672 days.

(21) Appl. No.: 11/562,601

(22) Filed: Nov. 22, 2006

(65) Prior Publication Data

US 2008/0118129 A1    May 22, 2008

(51) Int. Cl.
*G06T 15/00* (2006.01)
(52) U.S. Cl. .............. 345/419; 345/415; 345/427; 345/624; 382/128; 382/131; 364/413.22; 600/411; 600/437; 606/32
(58) Field of Classification Search ............. 345/419, 345/427, 145, 624; 378/4, 20; 382/128, 382/131; 600/407, 410, 437, 411; 464/413.22
See application file for complete search history.

(56) References Cited

U.S. PATENT DOCUMENTS

| | | | | |
|---|---|---|---|---|
| 5,371,778 A | | 12/1994 | Yanof et al. | |
| 5,825,843 A | * | 10/1998 | Kobayashi | 378/20 |
| 6,297,799 B1 | * | 10/2001 | Knittel et al. | 345/419 |
| 7,313,259 B2 | * | 12/2007 | Alyassin et al. | 382/128 |
| 2004/0047497 A1 | | 3/2004 | Daw et al. | |
| 2005/0171430 A1 | * | 8/2005 | Zhang et al. | 600/437 |
| 2007/0118100 A1 | * | 5/2007 | Mahesh et al. | 606/32 |
| 2007/0279435 A1 | * | 12/2007 | Ng et al. | 345/624 |

FOREIGN PATENT DOCUMENTS

WO    0229723 A1    4/2002

\* cited by examiner

*Primary Examiner*—Kimbinh T Nguyen
(74) *Attorney, Agent, or Firm*—Lewis, Rice & Fingersh, L.C.

(57) ABSTRACT

A cursor mode display system and method for indicating an offset distance between a cursor position on an image and a closest image slice in a corresponding image series. First, the three-dimensional coordinates associated with the cursor position on the image are determined by projecting the cursor position onto a three-dimensional patient coordinate system. The closest image slice is then identified as the image slice in the corresponding image series that is closest to the three-dimensional coordinates of the cursor position. The offset distance between the closest image slice and the three-dimensional coordinates associated with the cursor position is then calculated. If the offset distance does not exceed a threshold value, then the closest image slice is displayed. Otherwise a modified version of the closest image slice is displayed.

25 Claims, 7 Drawing Sheets

CURSOR MODE DISPLAY SYSTEM AND METHOD

FIELD

The embodiments described herein relate to an image viewing system and method and more particularly to systems and methods for displaying a number representing the offset distance between a three-dimensional cursor position in an image and the closest image slice in a corresponding linked image series.

BACKGROUND

Commercially available image display systems in the medical field utilize various techniques to present image data to a user. Specifically, image data produced within modalities such as Computed Tomography (CT), Magnetic Resonance (MR) and the like is displayed on a display terminal for review by a medical practitioner at a medical treatment site. This image data is used by the medical practitioner to determine the presence or absence of a disease, tissue damage, etc.

Currently, large volume imaging studies utilized by medical treatment sites, such as CT and MR, pose a significant diagnostic problem due to the large number of image data files that are created and stored for later review. A typical image dataset may easily contain over 2000 image slices that translate into a similar number of image data files organized into multiple image series. Due to the large number of slices contained in an image dataset it is inconvenient and time-intensive for the medical practitioner to manually navigate through the numerous image slices to identify the image slices that are most relevant to a current diagnosis.

Imaging systems exist today which alleviates this problem by allowing a user to select a three-dimensional (3D) coordinate position in a particular image and then automatically determining and displaying the closest image slice from the corresponding image series. Also, imaging systems that calculate the offset distance and display it, along with a cross hair referencing the cursor position within the closest image slice, are very useful to a medical practitioner and aid the medical practitioner in making an accurate diagnosis.

However, when the offset distance becomes too large, the displayed closest image slice and cross hair may not be an accurate representation of the 3D coordinates of the cursor position. Accordingly, the user may erroneously rely on the displayed closest image slice, even though the displayed closest image slice and the cross hair are not an accurate representation of the 3D coordinates of the cursor position.

SUMMARY

The embodiments described herein provide in one aspect, a cursor mode display system indicating an offset distance between a cursor position within a three-dimensional patient coordinate system on an image and a closest image slice in a corresponding image series, said system comprising:
(a) a memory for storing a threshold value and data associated with the image, the closest image slice and the corresponding image series;
(b) a processor coupled to the memory, said processor configured for:
  (i) determining the three-dimensional coordinates associated with the cursor position on the image by projecting the cursor position onto the three-dimensional patient coordinate system;
  (ii) determining the closest image slice from the corresponding image series by determining which image slice is closest to the three-dimensional coordinates of the cursor position;
  (iii) calculating the offset distance between the closest image slice and the three-dimensional coordinates associated with the cursor position;
  (iv) determining whether the offset distance exceeds a threshold value;
  (v) if the offset distance does not exceed the threshold value, displaying the closest image slice; and
  (iv) if the offset distance exceeds the threshold value, displaying a modified version of the closest image slice.

The embodiments described herein provide in another aspect, a method for indicating an offset distance between a cursor position within a three-dimensional patient coordinate system on an image and a closest image slice in a corresponding image series, said method comprising:
(a) determining the three-dimensional coordinates associated with the cursor position on the image by projecting the cursor position onto the three-dimensional patient coordinate system;
(b) determining the closest image slice from the corresponding image series by determining which image slice is closest to the three-dimensional coordinates of the cursor position;
(c) calculating the offset distance between the closest image slice and the three-dimensional coordinates associated with the cursor position;
(d) determining whether the offset distance exceeds a threshold value;
(e) if the offset distance does not exceed the threshold value, displaying the closest image slice; and
(f) if the offset distance exceeds the threshold value, displaying a modified version of the closest image slice.

Further aspects and advantages of the embodiments described will appear from the following description taken together with the accompanying drawings.

BRIEF DESCRIPTION OF THE DRAWINGS

For a better understanding of the embodiments described herein, and to show more clearly how it may be carried into effect, reference will now be made, by way of example only, to the accompanying drawings which show at least one exemplary embodiment, and in which.

Figure 1:
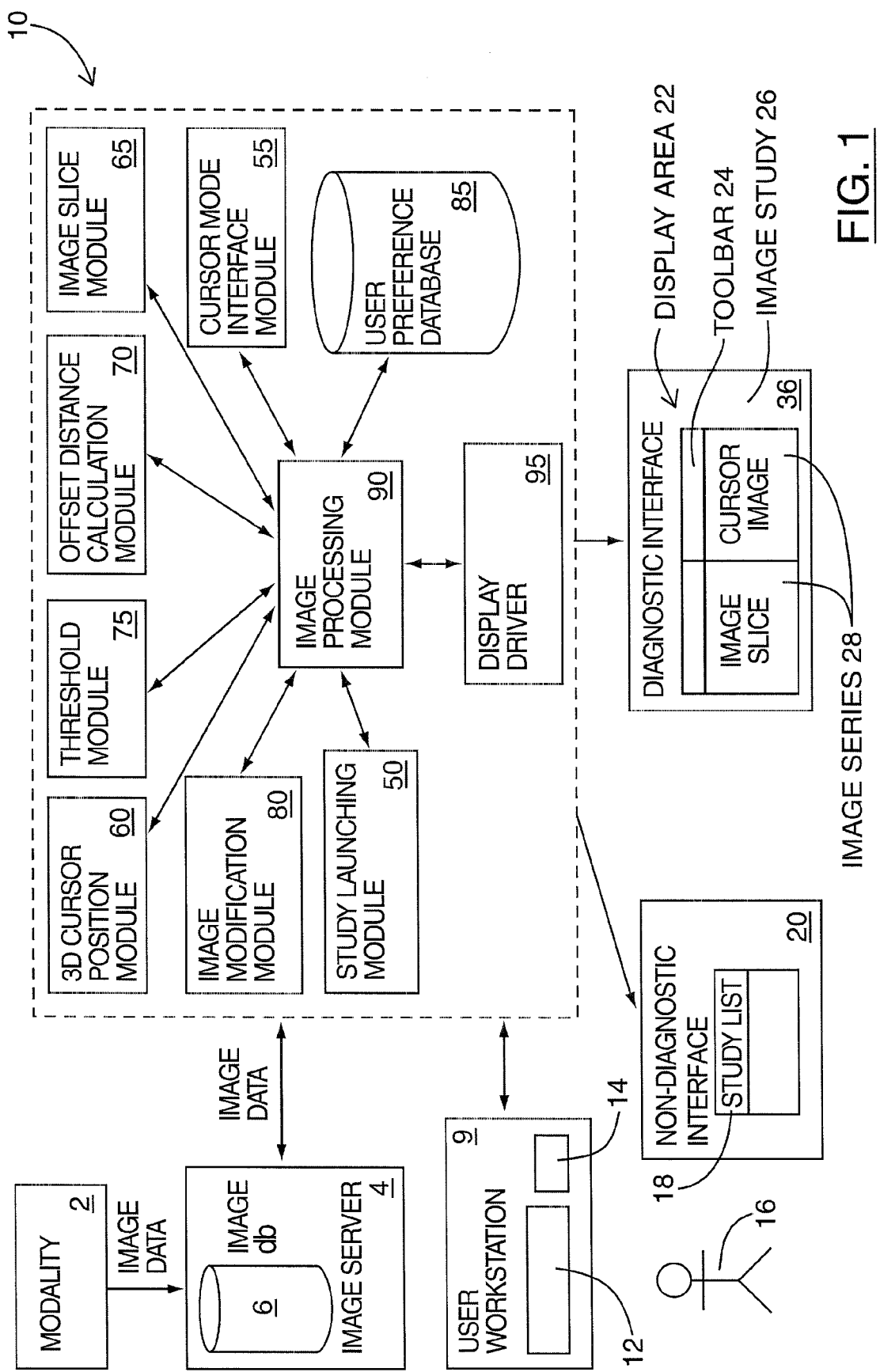
FIG. 1 is a block diagram of an exemplary embodiment of the cursor mode display system.

It will be appreciated that for simplicity and clarity of illustration, elements shown in the figures have not necessarily been drawn to scale. For example, the dimensions of some of the elements may be exaggerated relative to other elements

DETAILED DESCRIPTION

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), at least one input device, and at least one output device. For example and without limitation, the programmable computers may be a personal computer, laptop, personal data assistant, and cellular telephone. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Figure 2:
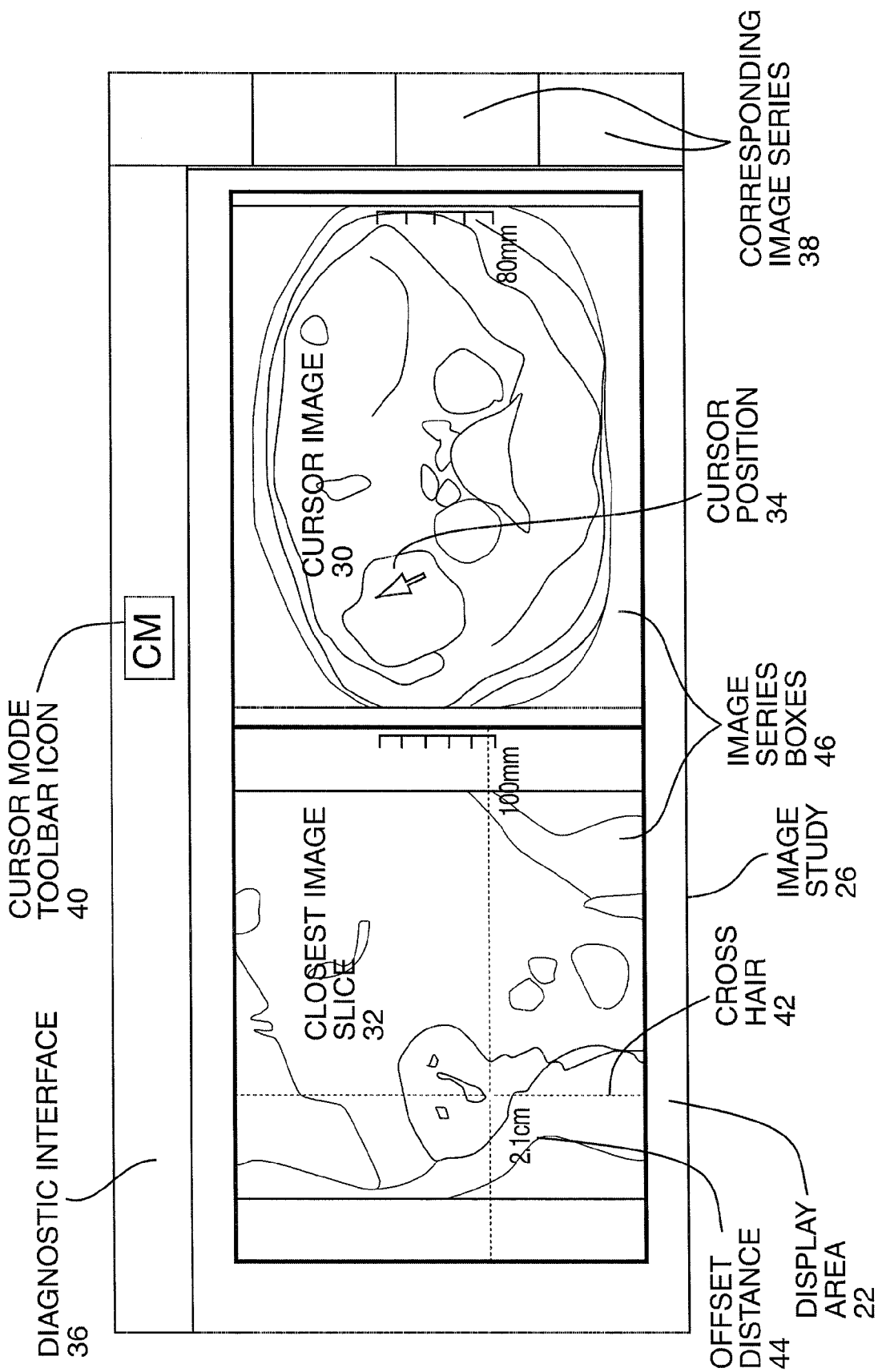
FIG. 2 is a schematic diagram illustrating an example interface generated by the cursor mode display system of FIG. 1.

Reference is first made to FIGS. 1 and 2, which illustrate the basic elements of an exemplary embodiment of a cursor mode display system 10. Specifically, cursor mode display system 10 includes an image processing module 90, a study launching module 50, a 3D cursor position module 60, an image modification module 80, a threshold module 75, an offset distance calculation module 70, an image slice module 65, a cursor mode interface module 55, a display driver 95, and a user preference database 85. Image data associated with one or more image studies 26 (or any other type of display entities such as image series or images) is generated by an imaging modality 2 and stored in an image database 6 on an image server 4 for retrieval by cursor mode display system 10. Cursor mode display system 10 displays an image study 26 (composed of one or more image series) on a diagnostic interface 36 and allows the user 16 to select a 3D cursor position within a displayed image series 28. Cursor mode display system 10 identifies the image slice closest to the 3D cursor position from the corresponding image series 28 and then calculates the offset distance between the 3D cursor position and the closest image slice, for display to the user 16 on the diagnostic interface 36.

As discussed in more detail above, it should be understood that cursor mode display system 10 may be implemented in hardware or software or a combination of both. Specifically, the modules of cursor mode display system 10 are preferably implemented in computer programs executing on programmable computers each comprising at least one processor, a data storage system and at least one input and at least one output device. Without limitation the programmable computers may be a mainframe computer, server, personal computer, laptop, personal data assistant or cellular telephone. In some embodiments, cursor mode display system 10 is implemented in software and installed on the hard drive of user workstation 9 and on image server 4, such that user workstation 9 interoperates with image server 4 in a client-server configuration. In other embodiments, the cursor mode display system 10 can run from a single dedicated workstation that may be associated directly with a particular modality 2. In yet other embodiments, the cursor mode display system 10 can be configured to run remotely on the user workstation 9 while communication with the image server 4 occurs via a wide area network (WAN), such as through the Internet.

Modality 2 is any conventional image data generating device (e.g. computed tomography (CT) and scanners, etc.) utilized to generate image data that corresponds to patient medical exams. A medical practitioner utilizes the image data generated by modality 2 to make a medical a diagnosis (e.g. for investigating the presence or absence of a diseased part or an injury or for ascertaining the characteristics of the diseased part or the injury). Modalities 2 may be positioned in a single location or facility, such as a medical facility, or may be remote from one another. Image data from modality 2 is stored in an image database 6 within an image server 4 as conventionally known. Modality 2 provides image data to the image server 4 in analog or any digital format used to represent medical image data (e.g. DICOM, bitmaps, JPEGs, GIFs, etc.). The image server 4 then converts the image data into a digital format (i.e. an image data file) suitable for storage within the image database 6 on the image server 4.

User workstation 9 includes a keyboard 12 and a user-pointing device 14 (e.g. mouse) as shown in FIG. 1. It should be understood that user workstation 9 can be implemented by any wired or wireless personal computing device with input and display means (e.g. conventional personal computer, laptop computing device, personal digital assistant (PDA), etc.) User workstation 9 is operatively connected to non-diagnostic interface 20 and diagnostic interface 36. As discussed, in one exemplary embodiment the modules of cursor mode display system 10 are preferrably installed on the hard drive of user workstation 9 and on the image server 4 such that user workstation 9 works with central image server 4 in a client-server configuration.

Non-diagnostic interface 20 displays an image study list 18 that provides a textual format listing of image studies 26 (or any other display entities) that are available for display. Image study list 18 also includes associated identifying indicia (e.g. body part, modality 2, etc.) and organizes image studies 26 in current and prior image study categories. Other associated textual information (e.g. patient information, image resolution quality, date of image capture, etc.) is simultaneously displayed within image study list 18 to assist the user 16 in selection of image studies 26. Typically, user 16 will review image study list 18 and select listed image studies for display on diagnostic interface 36. Non-diagnostic interface 20 is preferably provided using a conventional color computer monitor (e.g. a color monitor with a resolution of 1024×768) with sufficient processing power to run a conventional operating system (e.g. Windows NT). High resolution graphics are not necessary for non-diagnostic interface 20 since this display is only displaying textual information to user 16. In this discussion, it should be understood that the term "image study" as used in the present disclosure covers all different image types (e.g. image series, image studies, images, etc.) without exclusion.

Diagnostic interface 36 provides high resolution image display of image studies 26 to user 16 on display area 22 (FIG. 2). Diagnostic interface 36 is preferably provided using medical imaging quality display monitors with relatively high resolution typically used for viewing CT and MR image studies (e.g. grayscale "reading" monitors with a resolution of 1280-1024 and up). It should be understood that many other types of display configurations could be utilized within cursor mode display system 10 including the use of one, two or more displays.

Figure 5:
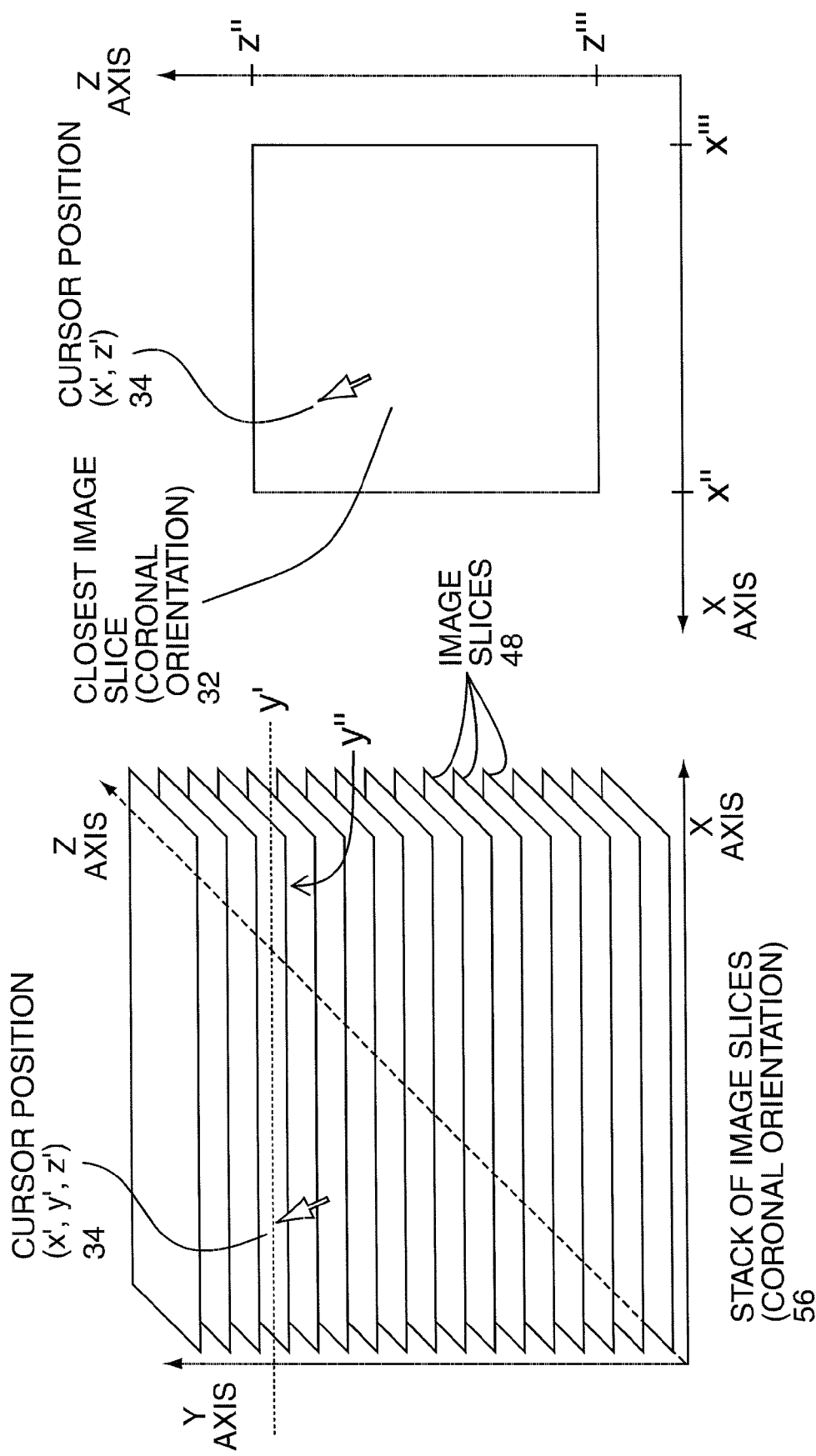
FIG. 5 is a schematic diagram illustrating a stack of image slices that contain the closest image slice.

In one exemplary embodiment of cursor mode display system 10, an image study list 18 of imaging studies 26 is provided to the user 16 on a non-diagnostic interface 20, where each imaging image study 26 contains one or more imaging series 28 composed of image slices 48 (FIG. 5). User 16 selects an image study 26 from the list of imaging studies 18 to be displayed on diagnostic interface 36. While the functionality of cursor mode display system 10 will be discussed in relation to the selection and display of image studies 26, it should be understood that the functionality of cursor mode display system 10 is equally applicable to the display and arrangement of any other image entity, such as image series or images and the like. In addition, it should be understood that one or more image studies 26 (or image series 28 or images) are typically associated with a particular patient.

Study launching module 50 retrieves image data that corresponds to the image study 26 selected for viewing and provides it to image processing module 90. The image processing module 90 generates an image data file containing image information such as the position and orientation of a particular image of image study 26 within a 3D patient coordinate system (as will be further described), pixel data representing the displayed image, and other image attributes such as patient information. All image series 28 within the selected image study 26 are associated with a corresponding image data file.

Image processing module 90 coordinates the activities of study launching module 50, cursor mode interface module 55, image slice module 65, offset distance calculation module 70, threshold module 75, 3D cursor position module 60, and image modification module 80 in response to commands sent by user 16 from user workstation 9.

When user 16 launches an image study 26 from the non-diagnostic interface 20, image processing module 90 instructs study launching module 50 to retrieve image data associated with selected image study 26 and to provide it to study launching module 50. Image processing module 90 instructs cursor mode interface module 55 to generate a cursor mode interface with a toolbar 24 containing a cursor mode toolbar icon 40 (FIG. 2).

Image processing module 90 also retrieves the cursor position 34 (FIG. 2) and image data associated with all corresponding image series 38 in order to determine the image slice within corresponding image series 38 which is closest in distance to the 3D coordinates of the cursor position 34 (herein referred to as the closest image slice 32). Image processing module 90 then provides the display driver 95 with image data associated with the closest image slice 32 for display on the diagnostic interface 36. Finally, image processing module 90 activates image modification module 80 if the offset distance exceeds the threshold value to modify the display of the closest image slice 32 (FIG. 5).

Cursor mode interface module 55 generates a graphical user interface having a toolbar 24 (FIG. 1) containing a cursor mode toolbar icon 40 (FIG. 2) used to activate cursor mode display system 10. FIG. 2 is a schematic diagram illustrating one exemplary embodiment of the graphical user interface generated by cursor mode interface module 55. Display area 22 contains a toolbar 24 generated by cursor mode interface module 55 containing the cursor mode toolbar icon 40 for activating cursor mode display system 10. Image processing module 90 displays the image study 26 selected for viewing, composed of one or more image series 28, and the cursor mode interface on the diagnostic interface 36 through the display driver 95. At least one image series (or other image entity) is displayed to the user 16 on the diagnostic interface 36. The at least one displayed image series will be herein referred to as the cursor image 30 (FIG. 2).

The cursor image 30 has at least one corresponding imaging series 38 composed of image slices 48 (FIG. 2). An imaging series 28 (i.e., the corresponding imaging series 38) corresponds to the cursor image 30 if it has the same frame of reference as the cursor image. It is apparent to those skilled in the art how one imaging series 28, or more generally an image entity, has the same frame of reference as another imaging series 28. It should be understood that in order to determine the frame of reference of an image entity (or image series 28), each image entity has a unique frame of reference identifier, namely a frame of reference identification, which is stored in the image data.

For example, if during acquisition a patient is in position 1, then all image series 28 generated from position 1 have the same frame of reference, and accordingly, the same frame of reference identification as configured by the user 16 or a professional service person. If during acquisition the patient moves to position 2, then all image series 28 generated from position 2 have another frame of reference, and accordingly, a different frame of reference identification (as configured by the user 16 or a professional service person) as those series generated from position 1.

Another example of two image series with the same frame of reference (i.e., two corresponding image series 38) is where a reformation of an image series 28 is calculated. If a reformation of an image series is calculated then the resulting image series 28 reformation will have the same frame reference as the underlying image series 28, i.e. the image series upon which the reformation was calculated. It should be understood that it would be apparent to those skilled in the art to calculate a reformation of an imaging series 28.

Alternatively, if two imaging series 28 do not have the same frame of reference then one of the imaging series 28 may be transformed into the same frame of reference as the other image series 28. A computationally intensive process called registration can transform one image series 28 into the same frame of reference as another image series 28. The image series 28 which has undergone the registration process can have a virtual frame of reference identification, stored in the image data, that references (i.e. links to) the same frame of reference identification as the other image series 28. It should be understood that the computational registration process would be apparent to those skilled in the art. In summary, all corresponding image series 38 have the same frame of reference, i.e., the same frame of reference identification, as stored in the image data.

As shown in FIG. 2, image series 28, such as cursor image 30 and closest image slice 32, are displayed within image series boxes 46 that are defined within display area 22. Corresponding linked image series 38 are also displayed within the display area 22. Optionally, the corresponding image series 38 are displayed in smaller image series boxes 46 so as not to detract from the display of cursor image 30 and the closest image slice 32 within the display area 22. It should be understood that this is only one exemplary embodiment and numerous other display arrangements will be apparent to those skilled in the art.

In an optional embodiment (FIG. 7), cursor mode interface module 55 generates a threshold calculation toolbar icon 41 contained in toolbar 24 for display within the display area 22. Threshold calculation toolbar icon 41 is used by user 16 to change the threshold calculation method used to calculate the stored threshold value, as will be further described.

Display driver 95 is a conventional display screen driver implemented using commercially available hardware and software. Display driver 95 ensures that various image entities are displayed in a proper format within diagnostic interface 36. Specifically, as shown in FIG. 2, image entities such as cursor image 30 and closest image slice 32 are displayed within image series boxes 46 that are defined within the display area 22. Corresponding image series 38 are also displayed in image series boxes 46 within the display area 22. Display driver 95 provides image data associated with image series 28 appropriately formatted so that the corresponding image series 38 and the image series 28 are appropriately displayed within one or more image series boxes 46.

User preference database 85 stores the threshold value associated with the offset distance between the 3D coordinates of the cursor position 34 and the closest image slice 32. The threshold value determines whether the closest image slice 32 should be modified by the image modification module 80. Optionally, the user preference database 85 can store information about what default threshold calculation method should be used to calculate the stored threshold value.

Figure 4:
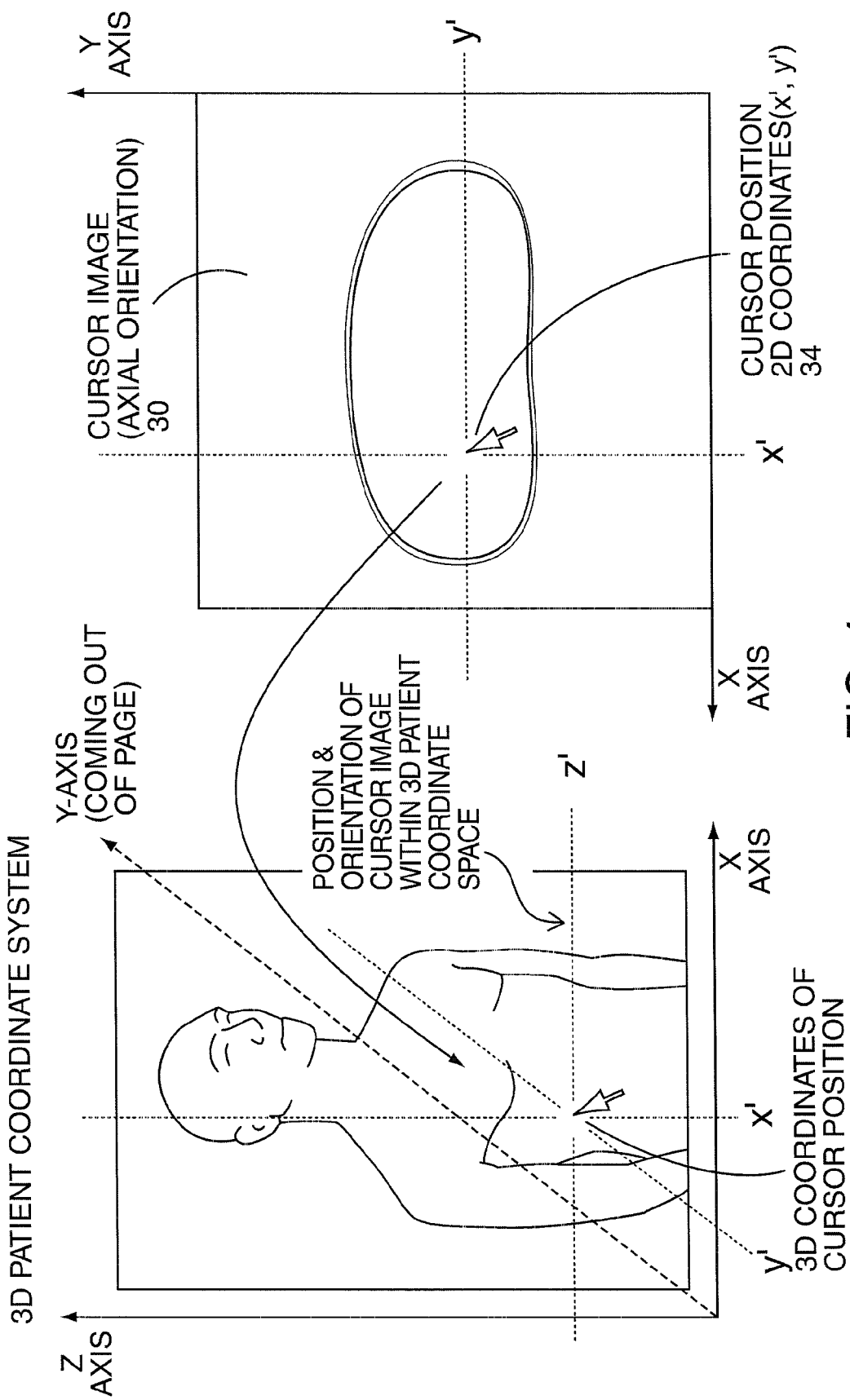
FIG. 4 is a schematic diagram illustrating the projection of a cursor position onto the 3D coordinate position.

3D cursor position module 60 is utilized by image processing module 90 to determine the 3D coordinates of the cursor position 34. 3D cursor position module 60 receives the cursor position 34 within the cursor image 30 from the image processing module 90 and projects the cursor position 34 onto a 3D patient coordinate system to determine the 3D coordinates of the cursor position. A 3D patient coordinate system consists of mapping a patient onto a 3D coordinate grid. In effect, this mapping creates a corresponding 3D coordinate for each position within the patient. How such a 3D patient coordinate system is configured is apparent to those skilled in the art. An exemplary illustration of a 3D patient coordinate system is shown in FIG. 4. However, it should be understood that the 3D patient coordinate system shown in FIG. 4 is merely a conceptual aid and not intended to accurately depict the precise mapping of a patient onto a 3D coordinate grid. 3D cursor position module 60 then provides the 3D coordinates of the cursor position 34 to image processing module 90 to determine the closest image slice 32 within the corresponding image series 38.

Image slice module 65 is utilized by image processing module 90 to determine which image slice within the corresponding image series 36 is closest to the 3D coordinates of the cursor position 34, namely the closest image slice 32. Image slice module 65 receives the 3D coordinates of the cursor position 34 and the image data file associated with the corresponding image series 38 currently displayed on the diagnostic interface 36 from image processing module 90. Image slice module 65 retrieves the position and orientation of all image slices 48 within the corresponding image series 38 from the image data file and determines which image slice, having the same frame of reference as cursor image 30 is closest to the 3D coordinates of the cursor position 34, as will be further described. Image slice module 65 then provides image processing module 90 with image data associated with the closest image slice 32.

Offset distance calculation module 70 is utilized by image processing module 90 to calculate the offset distance between the 3D coordinates of the cursor position 34 and the closest image slice 32. Offset distance calculation module 70 receives the 3D coordinates of the cursor position 34 and the image data file associated with the closest image slice 32 containing the position and orientation, or collectively the plane, of the closest image slice 32 within the 3D patient coordinate system. The offset distance is the smallest normal distance between the closest image slice 32 plane and the 3D coordinates of the cursor position 34. Offset distance calculation module 70 then provides the calculated offset distance to image processing module 90.

Threshold module 75 is utilized by image processing module 90 to determine whether the offset distance exceeds a threshold value stored in the user preference database 85. As previously mentioned, if the calculated offset distance is too large, there is a concern that the user 16 will erroneously rely on the closest image slice 32 displayed, even though the displayed closest image slice 32 is not an accurate representation of the 3D coordinates of the cursor position 34. Image processing module 90 retrieves the threshold value from the user preference database 85 and provides it to threshold module 75 along with the offset distance calculated by offset distance calculation module 70. Threshold module 75 determines whether the offset distance exceeds the threshold value (i.e.: the offset distance is too large) and returns a threshold result to the image processing module 90.

If the threshold result indicates that the offset value exceeds the threshold value, then image modification module 80 is activated by the image processing module 90 to modify the display of the closest image slice 32 on the diagnostic interface 36. When the offset distance becomes too large, the closest image slice 32 and cross hair 42 may not be an accurate representation of the 3D coordinates of the cursor position 34. Accordingly, the user may erroneously rely on the closest image slice 32, even though the displayed closest image slice 32 and the cross hair 42 are not an accurate representation of the 3D coordinates of the cursor position 34.

As discussed, the image modification module 80 modifies the display of the closest image slice 32 to prevent the user from erroneously relying on the displayed closest image slice 32. The image modification module 80 may modify the closest image slice 32 in numerous ways, such as blackening or fading the closest image slice. Alternatively, image modification module 80 may instruct image processing module 90 not to display the closest image slice 32 on the diagnostic interface 36 at all. Image modification module 80 may also generate a warning message for display on the diagnostic interface 36 to alert the user 16 that the offset distance is too large and that the closest image slice 32 may not be an accurate representation of the cursor position 34.

As previously discussed, while the functionality of cursor mode display system 10 is discussed in relation to the display and arrangement of image series 28 displayed within image series boxes 46 on a diagnostic interface 36, it should be understood that the functionality of cursor mode display system 10 is equally applicable to the display and arrangement of any other kind of image entity within a prescribed display area 22. More generally, it should be understood that the functionality of image modification module 80, 3D cursor position module 60, threshold module 75, offset distance calculation module 70, image slice module 65, study launching module 50, and cursor mode interface module 55 can be applied to any display system that is used to display image entities to a user 16.

Figure 3:
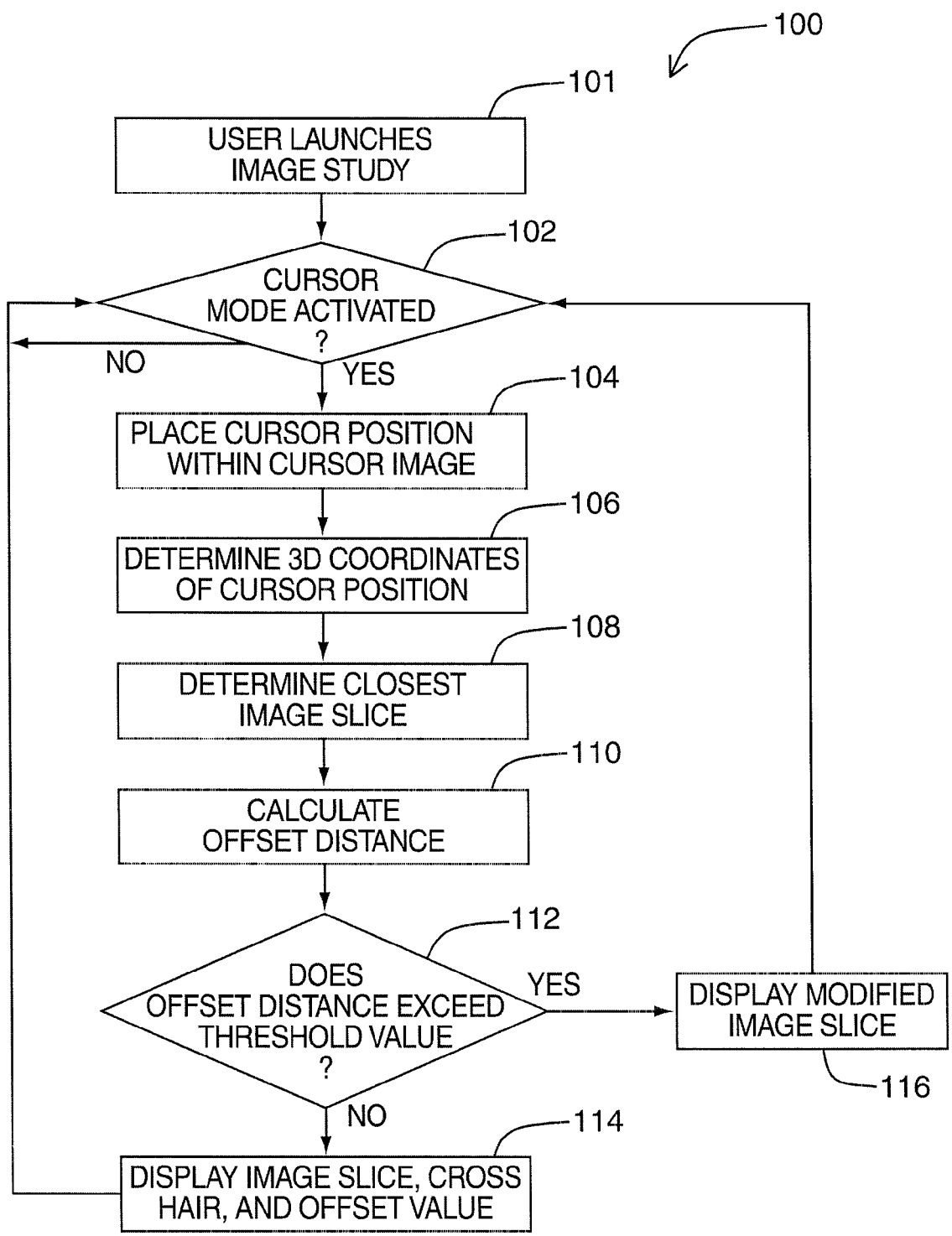
FIG. 3 is a flowchart diagram illustrating the main operational steps executed by the cursor mode display system of FIG. 1.

Referring now to FIGS. 1, 2, 3, there is illustrated the basic operation of cursor mode display system 10. Specifically, FIG. 3 is a flowchart diagram illustrating the process steps 100 executed by cursor mode display system 10. As noted above, while the general operation of cursor mode display system 10 will be discussed in respect of image studies 26, it should be understood that the cursor mode display functionality described is equally applicable to the display of any other kind of image entities such as for example, individual image series, individual images and the like.

At step (101), the user 16 selects an image study 26 composed of one or more image series 28 from the non-diagnostic interface 20 using the keyboard 12 and/or mouse 14 from the user workstation 9 for display on the diagnostic interface 36. The image processing module 90 requests the image data associated with the requested image study 26 from image server 4. Image server 4 identifies the requested image data and retrieves it from image database 6 and sends it to image processing module 90. An image data file associated with the selected image study 26 is generated from the image data. Image processing module 90 displays cursor image 30 and one or more corresponding image series 38 on the diagnostic interface 36 through the display driver 95. Cursor mode interface module 55 generates a graphical user interface screen (FIG. 2) with a toolbar 24 containing the cursor mode toolbar icon 40, which is then provided to image processing module 90 for display within the display area 22.

At step (102), image processing module 90 polls the cursor mode toolbar icon 40 to determine whether the user 16 has activated the cursor mode display system 10 using the mouse 14 of user workstation 9 to select the cursor mode toolbar icon 40. Alternatively, the user 16 can activate cursor mode display system 10 by selecting various hotkey(s) and mouse selection combinations (e.g. selecting the keyboard 12 CTRL button while moving the mouse 14 over a displayed image such as cursor image 30). The user 16 can de-activate cursor mode display system by re-selecting the cursor mode toolbar icon 40 with the mouse 14 or by releasing the selected hotkey(s) (e.g. by releasing the keyboard 12 CTRL button).

At step (104), the user 16 uses the mouse 14 to position the cursor over the displayed image series, namely cursor image 30, to a desired cursor position 34. The image processing module 90 retrieves the cursor position 34 and uses the image data file associated with the cursor image 30 to determine the 2D coordinates of the cursor position 34 within the cursor image 30. Referring to FIG. 4 as an example, the 2D coordinates of cursor position 34 within the cursor image 30 are (x',y'). The image processing module 90 provides the 2D coordinates of cursor position 34 and the cursor image 30 image data to the 3D cursor position module 60 to determine the 3D coordinates associated with the cursor position 34.

At step (106) the 3D cursor position module 60 determines the 3D coordinates of the cursor position 34 by projecting the cursor position 34 onto a 3D patient coordinate system (FIG. 4). First, the 3D cursor position module 60 retrieves the 2D coordinates of the cursor position 34 within the cursor image 30 from image processing module 90. The 2D coordinates of the cursor position 34 are relative to two of the three dimensions of the 3D patient coordinate system. Referring to FIG. 4 and the 2D coordinates of the cursor position 34 (x',y') as an example, x' falls on the x-axis of the 3D patient coordinate system and y' falls on the y-axis of the 3D patient coordinate system. It is apparent to those skilled in the art how the image processing module 90 uses the retrieved cursor position 34, the image data file containing the pixel data of the displayed cursor image 30 and the cursor image position within the 3D patient coordinate system to determine the 2D cursor position 34 relative to two of the three dimensions of the 3D patient coordinate system.

Next, the 3D cursor position module 60 uses the cursor image 30 image data file to get the position and orientation, or collectively the plane, of the cursor image 30 within the 3D patient coordinate system (FIG. 4). The 2D coordinates of the cursor position 34 are projected onto the cursor image 30 plane to determine the 3D coordinates of the cursor position 34 within the 3D patient coordinate space. It is apparent to those skilled in the art how the 2D coordinates of the cursor position 34 are projected onto the cursor image 30 plane to determine the 3D coordinates of the cursor position 34 within the 3D patient coordinate space. For example, a transformation matrix can be used to project 2D coordinates onto a 3D coordinate system.

Conceptually, the orientation and position of cursor image 30 provides one coordinate, the orientation coordinate, of the cursor position 34 within the 3D patient coordinate system. Which coordinate is provided depends on the orientation of the cursor image 30 and the coordinate value is provided by the position of the cursor image 30. For example, referring to FIG. 4 the cursor image 30 data file indicates that the cursor image 30 has an orientation and a position z' on the 3D patient coordinate system. The 3D cursor position module 60 uses the orientation coordinate to project the 2D coordinates of the cursor position 34 onto the z' plane and determines the 3D coordinates of the cursor position 34. Referring back to FIG. 4 as an example, the 2D coordinates, x' and y', are projected onto the 3D patient coordinate system, such that (x',y',z') are the 3D coordinates of the cursor position 34. Lastly, the 3D cursor position module 60 provides the 3D coordinates of the cursor position 34 to the image processing module 90.

Referring back to FIG. 3, at step (108), image slice module 65 receives the 3D coordinates of the cursor position 34 from the image processing module 90 to determine the closest image slice 32 from the corresponding image series 38. Image processing module 90 provides the image slice module 65 with image data associated with all corresponding image series 38 that are currently displayed on diagnostic interface 36. Each image slice 48 (FIG. 5) within the corresponding image series 38 has an associated image data file that contains the position and orientation of the image slice 48 within the 3D patient coordinate system. Image slice module 65 considers the position and orientation of all corresponding image series 38, i.e. those with the same frame of reference as the cursor image 30 (which is also the same frame of reference as the cursor position 34), to determine which image slice 48 is closest to the 3D coordinates of the cursor position 34. As previously mentioned, the frame of reference of an image series 28 is indicated by a frame of reference identification stored in the image file. Image slice module 65 will determine which image series 28 have the same frame of reference by comparing the image series' 28 frame of reference identification.

Referring to FIG. 5 as a conceptual example, the closest image slice 32 falls within the same frame of reference as the 3D coordinates of cursor position 34 (x', y', z'), since z' falls between z" and z'", and x' falls between x" and x'" and is the closest image slice 32 to the y' plane. The image slice module 65 provides the closest image slice 32 image data to the image processing module 90.

Referring back to FIG. 3, after the closest image slice 32 is determined, at step (110), the offset distance calculation module 70 calculates the offset distance between the 3D coordinates of the cursor position 34 and the closest image slice 32. The offset distance calculation module 70 first retrieves the closest image slice 32 image data and the 3D coordinates of the cursor position 34 from the image processing module 90. As previously mentioned, the closest image slice 32 image data contains the position and orientation, or collectively the plane, of the closest image slice 32 within the 3D patient coordinate system. The offset distance calculation module 70 calculates the offset distance, namely, the smallest normal distance between the 3D coordinates of the cursor position 34 and the closest image slice 32 plane. It is known to those skilled in the art how the normal distance between a plane and a 3D coordinate point is calculated.

Referring back to FIG. 5 the offset distance is the smallest normal distance between y", the closest image slice 32 plane, and (x', y', z') the coordinates of the 3D coordinate cursor position 34. The offset distance calculation module 70 provides the offset distance to the image processing module 90.

As previously mentioned, if the offset distance is too large there is concern that a user 16 will erroneously rely on the displayed closest image slice 32, even though it is not an accurate representation of the 3D cursor position 34. Therefore, at step (112) the threshold module 75 determines whether the offset distance exceeds a threshold value, stored in the user preference database 85. The image processing module 90 retrieves the threshold value from the user preference database 85 and provides the threshold value along with the offset distance to the threshold module 75. The threshold module 75 determines if the offset distance exceeds the threshold value and returns the threshold result to the image processing module 90.

The threshold value is optionally set using one of various methods at the time cursor mode display system 10 is activated. One exemplary method uses a predetermined threshold value that is selected by the user 16 and stored in the user preference database 85.

Another exemplary method automatically selects the threshold value based on the spacing between the image slices 48 from all displayed corresponding image series 38. One example of this approach is based on the assumption that all series image slices 48 have the same distance between them. Upon activating cursor mode at step (101) the image processing module 90 retrieves the image data associated with all displayed corresponding image series 38. The image data inherently contains the distance D (FIG. 6) between all image slices 48 within all corresponding image series 38 by using the position and orientation of all the image slices 48 within the corresponding image series 38.

Figure 6:
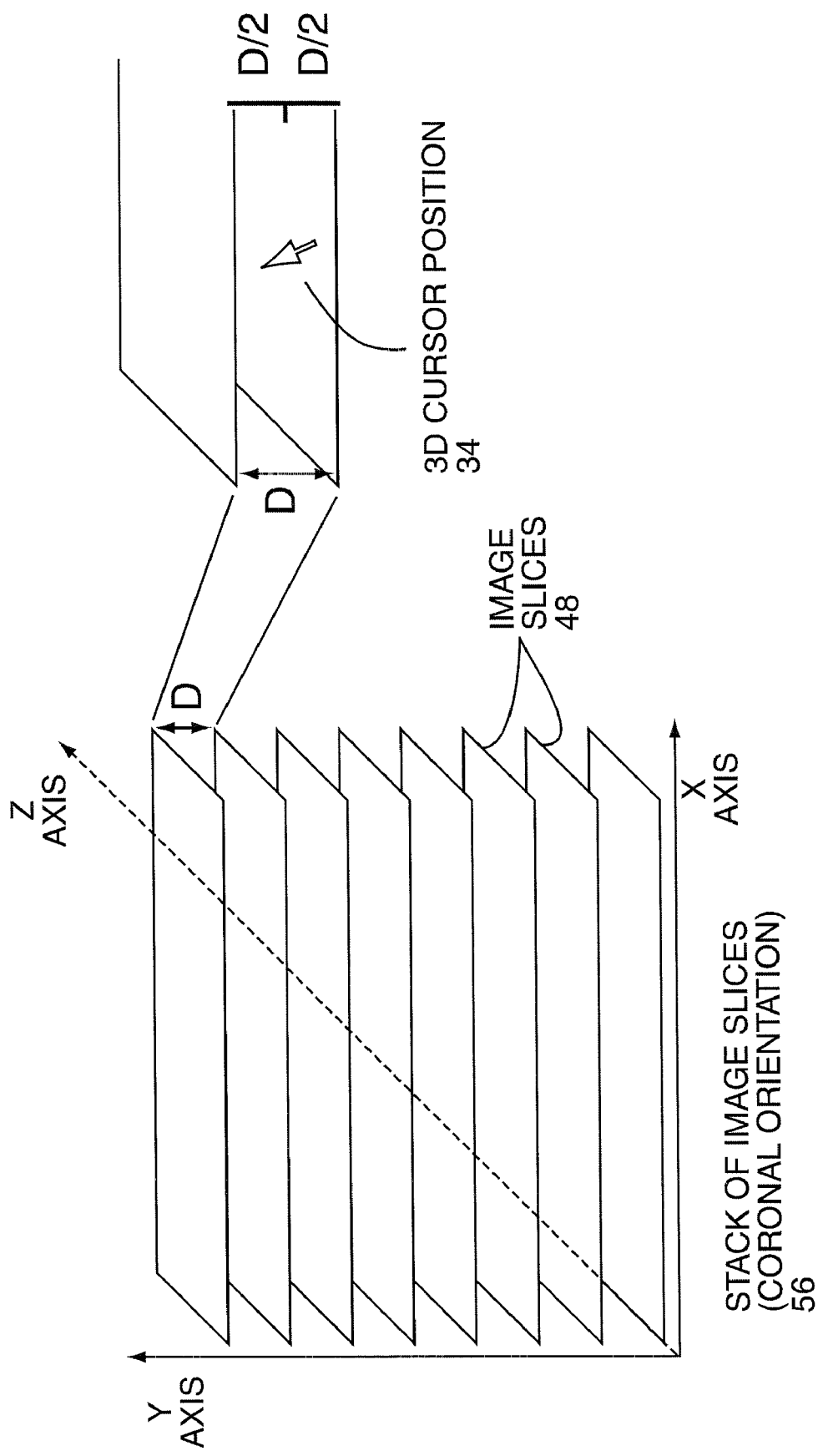
FIG. 6 is a schematic diagram illustrating a stack of image slices and the distance between the series image slices.

Referring to FIG. 6, the maximum offset distance between the 3D coordinates of the cursor position 34 and the closest image slice 32 will be D/2 (i.e.: when the 3D coordinates of the cursor position is exactly in the middle of two image slices) and D/2 will be the threshold value for this embodiment. The image processing module 90 will store the threshold value of D/2 in the user preference database 85.

Another exemplary method allows the user 16 to manually set the threshold value by marking up a region within the cursor image 30. In one example approach of this method, the cursor mode interface module 55 allows the user 16 to create a sphere shaped markup (not shown) on the cursor image 30 around the cursor position 34. The user 16 is able to adjust the size of the sphere using markup handles. The image processing module 90 would determine the position of the sphere within the 3D patient coordinate system and store this information in the user preference database 85. The threshold module 75 would retrieve the sphere's position within the 3D patient coordinate system and determine, using the closest image slice 32 image data, whether the closest image slice 32 intersects with the sphere's position. Those skilled in the art understand how to determine whether the closest image slice 32 intersects with the sphere's position. If so, the threshold module 75 will determine that the threshold value is not exceeded. Otherwise the threshold module 75 will determine that the threshold value has been exceeded.

Figure 7:
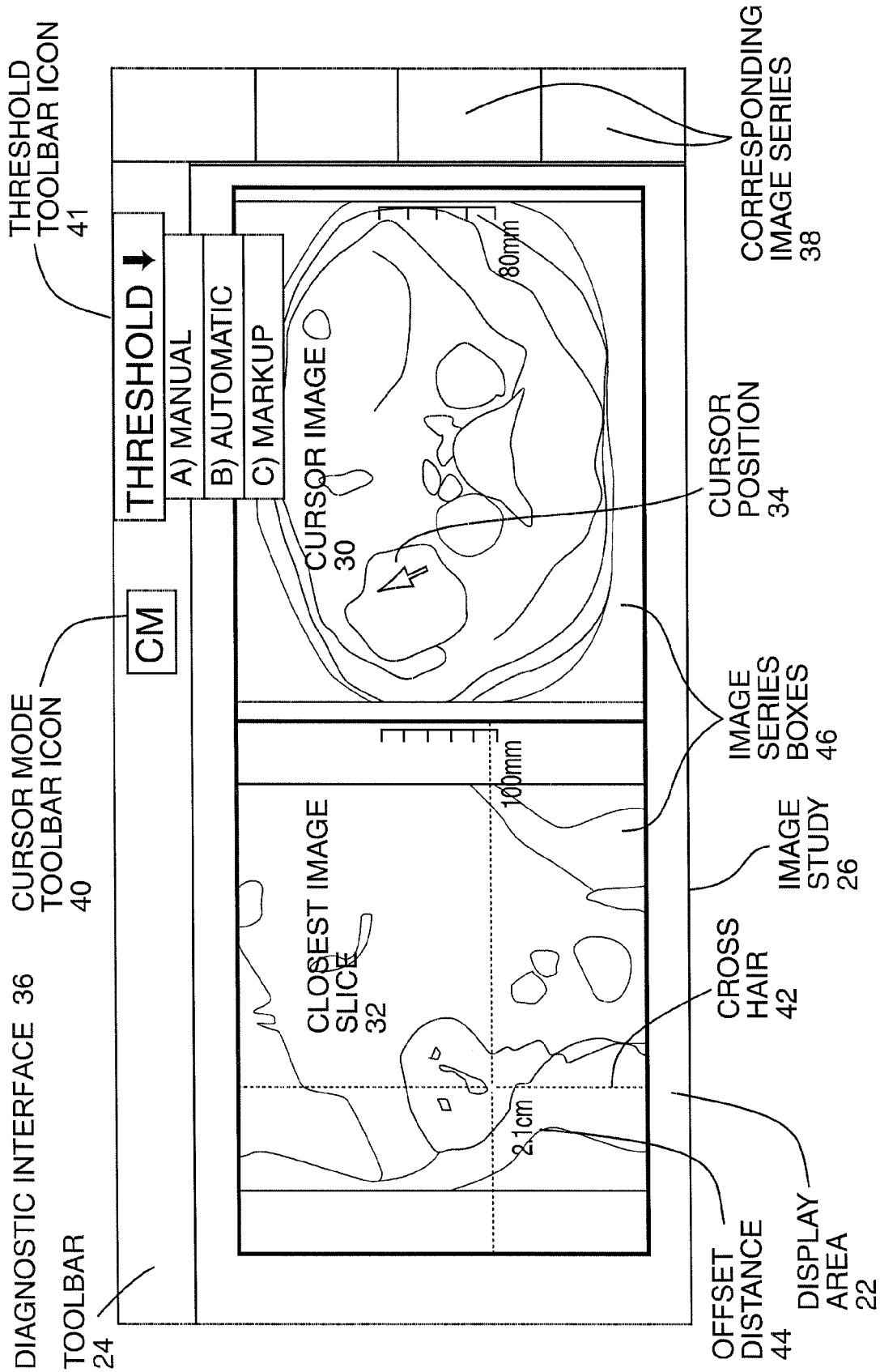
FIG. 7 is a schematic diagram illustrating another example interface generated by the cursor mode display system of FIG. 1.

In another exemplary embodiment, the user 16 is allowed to adjust the threshold value stored in the user preference database 85 at any time during the cursor mode display system 10 session. As shown in FIG. 7, the cursor mode interface module 55 generates a threshold calculation toolbar icon 41 within the toolbar 24 to allow the user 16 to select the threshold calculation method using the mouse 14 from the user workstation 9. The image processing module 90 polls the threshold calculation toolbar icon to determine what threshold calculation method the user 16 has chosen.

Alternatively, the threshold calculation method could be dependent on the image data. In one example approach of this alternative method, the cursor mode display system 10 segments the cursor image 30 image data to determine the approximate size of an object within the cursor image, where the approximate size of the object is used to set the threshold value. This segmentation could be achieved by determining a neighborhood within the cursor image 30, with similar image density values (as stored in the image data). Note that this segmentation process is apparent to those skilled in the art. For example, if the object located within the cursor image 30 was a tumor and the cursor was positioned over the tumor, the cursor mode system 10 could segment the tumor to approximate the size of the tumor. The size of the tumor is used to calculate the threshold value. In this example, only those closest image slices 32 whose plane intersects with the approximated tumor are displayed. Those skilled in the art understand how to determine whether the closest image slice 32 plane intersects with the approximated object. It should be understood that this is only one exemplary embodiment of a threshold calculation method dependent on the image data and numerous other embodiments will be apparent to those skilled in the art.

Upon the selection of a calculation method, the image processing module 90 calculates the threshold and stores it in the user preference database 85. In addition, the cursor mode display system could allow the user 16 to specify a default threshold calculation mode and the image processing module 90 would store this default method in the user preference database 85. Upon activating cursor mode display system 10, if the user 16 makes no explicit threshold method calculation selection, then the image processing module 90 would calculate the threshold value according to the default method and store the resulting threshold value in the user preference database 85.

At step (112) the image processing module 90 receives the threshold result from the threshold module 75. If the offset distance does not exceed the threshold value then at step (114) the image processing module 90 provides the image data associated with the closest image slice 32 and the offset distance to the display driver 95, which then displays the closest image slice 32 in an image series box 46 and the offset distance 44 on the diagnostic interface 36. Cursor mode interface module 55 generates a cross hair 42 within the closest image slice 32 (FIG. 2). The cross hair 42 represent the location of the 3D coordinates of the cursor position 34 within the closest image slice 32.

Finally, at step (116) if the offset distance exceeds the threshold value then the image processing module 90 activates the image modification module 80 to modify the display of the closest image slice 32 on the diagnostic interface 36. As previously mentioned, when the offset distance becomes too large, the closest image slice 32 and cross hair 42 may not be an accurate representation of the 3D coordinates of the cursor position 34. Accordingly, the user may erroneously rely on the closest image slice 32, even though the displayed closest image slice 32 and the cross hair 42 are not an accurate representation of the 3D coordinates of the cursor position 34.

As discussed, the image modification module 80 modifies the display of the closest image slice 32 to prevent the user from erroneously relying on the displayed closest image slice 32. The image modification module 80 can modify the closest image slice 32 in various ways. For example, the image modification module 80 may blacken out the closest image slice 32 on the diagnostic interface 36. Alternatively, the image modification module 80 may progressively fade the closest image slice 32 on the diagnostic interface 36 as the offset distance approaches the threshold value. In addition, the image modification module 80 may generate a warning message or symbol, such as for example "Image is modified due to the fact that the offset distance is X mm" and provide it to the image processing module 90 for display on the diagnostic interface 36 on top of the closest image slice 32 (not shown).

In summary, cursor mode display system 10 provides a user 16 with the ability to conveniently select a 3D cursor position 34 and then determines the series image slice 48 from all corresponding image series 38 closest to the 3D coordinates of the cursor position 34. Cursor mode display system 10 then calculates the offset distance between the 3D coordinates of the cursor position 34 and the closest image slice 32 and determines whether that value exceeds a threshold value. If the threshold value has been exceeded, cursor mode display system will modify the display of the closest image slice 32 to prevent the user 16 from erroneously relying on the displayed closest image slice 32 as an accurate representation of the 3D cursor position 34. If the offset distance is below the threshold value, then cursor mode display system 10 will display the closest image slice 32, cross hair 42, and the offset distance 44 to the user 16 on the diagnostic interface 36.

While the various exemplary embodiments of the cursor mode display system 10 have been described in the context of medical image management in order to provide an application-specific illustration, it should be understood that cursor mode display system 10 could also be adapted to any other type of image or document display system.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A cursor mode display system indicating an offset distance between a cursor position within a three-dimensional patient coordinate system on a medical patient image and a closest medical patient image slice in a corresponding medical patient image series, said system comprising:
   a) a memory for storing a threshold value and data associated with the medical patient image, the closest medical patient image slice and the corresponding medical patient image series;
   b) a processor coupled to the memory, said processor configured for:
      (i) determining the three-dimensional coordinates associated with the cursor position on the medical patient image by projecting the cursor position onto the three-dimensional patient coordinate system;
      (ii) determining the closest medical patient image slice from the corresponding medical patient image series by determining which medical patient image slice is closest to the three-dimensional coordinates of the cursor position;
      (iii) calculating the offset distance between the closest medical patient image slice and the three-dimensional coordinates associated with the cursor position;
      (iv) determining whether the offset distance exceeds a threshold value;
      (v) if the offset distance does not exceed the threshold value, displaying the closest medical patient image slice; and
      (vi) if the offset distance exceeds the threshold value, displaying a modified version of the closest medical patient image slice.

2. The system of claim 1 wherein at least one of:
   A) if the offset distance does not exceed the threshold value, said processor is further configured for displaying the corresponding offset distance;
   B) the memory stores the threshold value that is predetermined within a user preference database; and
   C) the memory stores a default method of determining the threshold value.

3. The system of claim 1 wherein if the offset distance does not exceed the threshold value, said processor is further configured for displaying a cross hair that represents the three-dimensional coordinates of the cursor position within the closest medical patient image slice.

4. The system of claim 1, wherein the processor is further adapted for automatically determining a threshold value based on the distance between the medical patient image slices in the corresponding medical patient image series.

5. The system of claim 1, wherein the processor is further configured for calculating a threshold value based on a manual selection of a particular region on an medical patient image.

6. The system of claim 1, wherein the processor is further configured for determining the threshold value depending on medical patient image data associated with the medical patient image.

7. The system of claim 1, wherein the processor is further configured for determining a user specified default method of determining the threshold value.

8. The system of claim 1, wherein the processor is further configured for determining the default method of determining the threshold value depending on medical patient image data associated with the medical patient image.

9. The system of claim 1, wherein if the offset distance exceeds the threshold value, the processor is further configured for not displaying the closest medical patient image slice.

10. The system of claim 1, wherein if the offset distance exceeds the threshold value, the processor is further configured for blackening out the closest medical patient image slice.

11. The system of claim 1, wherein the processor is further configured for fading the closest medical patient image slice to black as the offset distance approaches the threshold value.

12. The system of claim 1, wherein if the offset distance exceeds the threshold value then the processor is further configured for displaying an alert message to a user.

13. A computer-implemented method for indicating an offset distance between a cursor position within a three-dimensional patient coordinate system on a medical patient image and a closest medical patient image slice in a corresponding medical patient image series, said method comprising:
   a) determining the three-dimensional coordinates associated with the cursor position on the medical patient image by projecting the cursor position onto the three-dimensional patient coordinate system;
   b) determining the closest medical patient image slice from the corresponding medical patient image series by determining which medical patient image slice is closest to the three-dimensional coordinates of the cursor position;
   c) calculating the offset distance between the closest medical patient image slice and the three-dimensional coordinates associated with the cursor position;
   d) determining whether the offset distance exceeds a threshold value;
   e) if the offset distance does not exceed the threshold value, displaying the closest medical patient image slice; and
   f) if the offset distance exceeds the threshold value, displaying a modified version of the closest medical patient image slice.

14. The method of claim 13, wherein at least one of:
   A) if the offset distance does not exceed the threshold value, said method further comprising of displaying the corresponding offset distance;
   B) the threshold value is predetermined and stored within a user preference database; and
   C) a default method of determining the threshold value is stored.

15. The method of claim 13, wherein if the offset distance does not exceed the threshold value, said method further comprising of displaying a cross hair that represents the three-dimensional coordinates of the cursor position within the closest medical patient image slice.

16. The method of claim 13, wherein the threshold value is automatically determined based on the distance between the medical patient image slices in the corresponding medical patient image series.

17. The method of claim 13, wherein the threshold value is manually set by selection of a particular region on an medical patient image.

18. The method of claim 13, wherein the threshold value is automatically determined depending on medical patient image data associated with the medical patient image.

19. The method of claim 18, wherein the user specifies the default method of determining the threshold value.

20. The method of claim 18, wherein the default method of determining the threshold value is dependant on medical patient image data associated with the medical patient image.

21. The method of claim 13, wherein if the offset distance exceeds the threshold value, the closest medical patient image slice is not displayed.

22. The method of claim 13, wherein if the offset distance exceeds the threshold value the closest medical patient image slice is blackened out.

23. The method of claim 13, wherein the closest medical patient image slice fades to black as the offset distance approaches the threshold value.

24. The method of claim 13, wherein if the offset distance exceeds the threshold value an alert message is displayed to a user.

25. A non-transitory computer-readable medium upon which a plurality of instructions are stored, the instructions for performing the steps of the method as claimed in claim 13.

* * * * *